US011338250B2

(12) United States Patent
Ohno et al.

(10) Patent No.: US 11,338,250 B2
(45) Date of Patent: *May 24, 2022

(54) SUBSTRATE FOR LIQUID FILTER

(71) Applicant: TEIJIN LIMITED, Osaka (JP)

(72) Inventors: Takao Ohno, Ehime (JP); Kouji Furuya, Ehime (JP)

(73) Assignee: TEIJIN LIMITED, Osaka (JP)

( * ) Notice: Subject to any disclaimer, the term of this patent is extended or adjusted under 35 U.S.C. 154(b) by 492 days.

This patent is subject to a terminal disclaimer.

(21) Appl. No.: 14/889,180

(22) PCT Filed: May 2, 2014

(86) PCT No.: PCT/JP2014/062124
§ 371 (c)(1),
(2) Date: Nov. 5, 2015

(87) PCT Pub. No.: WO2014/181760
PCT Pub. Date: Nov. 13, 2014

(65) Prior Publication Data
US 2016/0096152 A1  Apr. 7, 2016

(30) Foreign Application Priority Data

May 7, 2013  (JP) ................. 2013-097629
May 7, 2013  (JP) ................. 2013-097630
May 7, 2013  (JP) ................. 2013-097635

(51) Int. Cl.
*B01D 71/26* (2006.01)
*B01D 69/02* (2006.01)
*B01D 67/00* (2006.01)
*B01D 69/10* (2006.01)

(52) U.S. Cl.
CPC .......... *B01D 71/26* (2013.01); *B01D 67/003* (2013.01); *B01D 67/0027* (2013.01); *B01D 69/02* (2013.01); *B01D 2325/02* (2013.01); *B01D 2325/04* (2013.01); *B01D 2325/20* (2013.01); *B01D 2325/22* (2013.01); *B01D 2325/24* (2013.01)

(58) Field of Classification Search
CPC ................................................ B01D 2325/34
See application file for complete search history.

(56) References Cited

U.S. PATENT DOCUMENTS

| | | | | |
|---|---|---|---|---|
| 4,778,601 A * | 10/1988 | Lopatin | ................. | B01D 67/003 210/500.27 |
| 4,874,568 A * | 10/1989 | Chau | .................... | B01D 67/003 264/49 |
| 5,051,183 A * | 9/1991 | Takita | .................... | B01D 71/26 210/500.36 |
| 5,318,866 A * | 6/1994 | Degen | ................. | H01M 2/1653 429/206 |
| 6,153,133 A * | 11/2000 | Kaimai | ............... | B01D 67/0009 264/41 |
| 6,248,682 B1 * | 6/2001 | Thompson | .............. | C08G 77/20 502/4 |
| 7,512,326 B1 * | 3/2009 | Eldredge | ................. | G03B 17/08 396/25 |
| 2002/0090876 A1 * | 7/2002 | Takase | .................... | D21H 13/14 442/363 |
| 2007/0148552 A1 * | 6/2007 | Ikemoto | ................. | B01D 71/26 429/254 |
| 2008/0090035 A1 * | 4/2008 | Baune | ...................... | B01J 20/10 428/34.4 |
| 2009/0081543 A1 * | 3/2009 | Takita | ................. | B01D 67/0027 429/188 |
| 2010/0178544 A1 * | 7/2010 | Nishikawa | ......... | B01D 67/0011 429/129 |
| 2015/0214528 A1 * | 7/2015 | Sano | ...................... | B32B 23/08 429/145 |

FOREIGN PATENT DOCUMENTS

| | | | |
|---|---|---|---|
| JP | 2-251545 | A | 10/1990 |
| JP | 3-64334 | A | 3/1991 |
| JP | H05310989 | A * | 11/1993 |
| JP | 6-104736 | B2 | 12/1994 |
| JP | 7-246322 | A | 9/1995 |
| JP | 10-263374 | A | 10/1998 |
| JP | 2004323820 | A * | 11/2004 |
| JP | 2007-54830 | A | 3/2007 |
| JP | 2010-53245 | A | 3/2010 |
| JP | 2010-202828 | A | 9/2010 |

OTHER PUBLICATIONS

ASTM International, ASTM E 128-61, Standard test method for maximum pore diameter and permeability of rigid porous filters for laboratory use (1985). (Year: 1985).*

A. Larbot, Ceramic processing techniques of support systems for membranes synthesis, in Fundamentals of Inorganic Membrane Science and Technology, 134 (1996). (Year: 1996).*

Sing et al., Reporting Physisorption Data for Gas/Solid Systems with Special Reference to the Determination of Surface Area and Porosity, 57 Pure & Appl. Chem., 603, 612-13 (1985). (Year: 1985).*

International Search Report of PCT/JP2014/062124 dated Jun. 3, 2014.

Korean Office Action dated Oct. 29, 2019, issued by the Korean Intellectual Property Office in Partial Application No. 10-2015-7034487.

* cited by examiner

*Primary Examiner* — Brad Gordon
(74) *Attorney, Agent, or Firm* — Sughrue Mion, PLLC

(57) ABSTRACT

A substrate for a liquid filter, which includes a polyolefin microporous membrane, the polyolefin microporous membrane having a water permeation efficiency of 0.10 to 0.50 ml/min·cm$^2$, the polyolefin microporous membrane having a bubble point of 0.50 MPa or more and 0.80 MPa or less.

9 Claims, No Drawings

SUBSTRATE FOR LIQUID FILTER

CROSS REFERENCE TO RELATED APPLICATIONS

This is a National Stage of International Application No. PCT/JP2014/062124 filed May 2, 2014 (claiming priority based on Japanese Patent Application Nos. 2013-097629 filed May 7, 2013, 2013-097630 filed May 7, 2013, and 2013-097635 filed May 7, 2013), the contents of which are incorporated herein by reference in their entirety.

TECHNICAL FIELD

The present invention relates to a substrate for a liquid filter.

BACKGROUND ART

In recent years, electronic devices are becoming increasingly smaller with higher performance. In particular, digital devices and portable terminals, as typified by personal computers and smartphones, have been dramatically developed. Among various techniques leading and supporting such development, as is well known, technological innovation in the semiconductor industry has played a major role. In the recent semiconductor industry, the development race is going on in the field where the wiring pattern dimension is below 20 nm, and the manufacturers have been accelerating the construction of cutting-edge production lines.

A lithography step is a step of forming a pattern in the production of semiconductor parts. With the recent development of finer patterns, an extremely high level of technology has been required not only in terms of the nature of the liquid chemical used in a lithography step itself but also for the handling of the liquid chemical prior to application onto a wafer.

A liquid chemical prepared at high level is filtered through a dense filter immediately before application onto a wafer to remove particles that would greatly affect the pattern formation or yield. In the cutting-edge formation of patterns of less than 20 nm, the capability of collecting particles of less than about 10 nm is required, and filter manufacturers are vigorously advancing the development.

Generally, a liquid filter includes, as a substrate, a porous membrane made of a resin such as polyethylene, polytetrafluoroethylene, nylon, or polypropylene, and is processed into the form of a cartridge and used. Substrates are used according to the intended application in terms of compatibility with the liquid chemical, collection efficiency, processing capacity, life, and the like. Recently, the reduction of dissolved matter derived from the substrate has been particularly emphasized, and polyethylene microporous membranes are commonly used as substrates.

As typical methods for producing a polyethylene microporous membrane, a phase separation method and a drawing method can be mentioned. A phase separation method is a technique that forms pores utilizing the phase separation phenomenon of a polymer solution. Examples thereof are a heat-induced phase separation method in which phase separation is induced by heat as described in PTL 1, a non-solvent-induced phase separation method utilizing the solubility characteristics of a polymer to the solvent, etc. In addition, it is also possible to combine the two techniques, heat-induced phase separation and non-solvent-inducted phase separation, or to further adjust the shape or size of the pore structure by drawing to increase the variation. A drawing method is, for example, as described in PTLs 2 to 5, a method in which a polyethylene raw sheet formed in a sheet shape is drawn to extend the amorphous part in the crystal structure under adjusted drawing conditions including the speed, ratio, temperature, etc., thereby forming micropores between lamella layers while forming microfibrils.

CITATION LIST

Patent Literature

PTL 1: JP-A-2-251545
PTL 2: JP-A-2010-053245
PTL 3: JP-A-2010-202828
PTL 4: JP-A-7-246322
PTL 5: JP-A-10-263374

SUMMARY OF INVENTION

Technical Problem

However, when fine particles of less than about 10 nm are to be efficiently collected, conversely, the liquid permeability tends to decrease. That is, there is a trade-off relationship between collection efficiency and liquid permeability.

In addition, during the long-term use of a liquid filter, due to repeated application of pressure to the polyolefin microporous membrane, the porous structure may change, resulting in a gradual decrease in the liquid permeability. In order to solve such a problem in long-term stable use, it is possible to provide a polyolefin microporous membrane with a rigid structure, for example. However, this also affects the collection efficiency or liquid permeability.

Further, in the related art such as PTLs 1 to 5, no proposal has been made to achieve excellent collection efficiency for fine particles of less than about 10 nm together with excellent liquid permeability, and further also achieve stable liquid permeability for long-term use.

Thus, in order to solve the problems mentioned above, an object of the invention is to provide a substrate for a liquid filter, which has excellent collection efficiency for fine particles of less than about 10 nm together with excellent liquid permeability, and also has stable liquid permeability for long-term use.

Solution to Problem

In order to solve the problems mentioned above, the invention is configured as follows.

1. A substrate for a liquid filter, including a polyolefin microporous membrane,
the polyolefin microporous membrane having a water permeation efficiency of 0.10 to 0.50 ml/min·cm$^2$,
the polyolefin microporous membrane having a bubble point of 0.50 MPa or more and 0.80 MPa or less.
2. The substrate for a liquid filter according to 1 above, wherein the polyolefin microporous membrane has a heat shrinkage of 15% or more in the width direction after a heat treatment at 120° C. for 1 hour.
3. The substrate for a liquid filter according to 1 above or 2, wherein the polyolefin microporous membrane has a thickness of 7 to 15 μm.
4. The substrate for a liquid filter according to any one of 1 to 3 above, wherein the polyolefin microporous membrane has a tensile elongation of more than 55% and 200% or less in the length direction.

5. The substrate for a liquid filter according to any one of 1 to 4 above, wherein the polyolefin microporous membrane has a cushion factor of more than 30%.
6. The substrate for a liquid filter according to any one of 1 to 5 above, wherein the polyolefin microporous membrane has a pore-blocking temperature of more than 140° C.
7. The substrate for a liquid filter according to any one of 1 to 6 above, wherein the polyolefin microporous membrane has a compressibility of less than 15%.
8. The substrate for a liquid filter according to any one of 1 to 7 above, wherein the polyolefin microporous membrane has a porosity of 46 to 54%.
9. The substrate for a liquid filter according to any one of 1 to 8 above, wherein the ratio of the tensile elongation in the length direction (MD tensile elongation) to the tensile elongation in the width direction (TD tensile elongation) of the polyolefin microporous membrane (MD tensile elongation/TD tensile elongation) is 0.8 to 4.0.

Advantageous Effects of Invention

The invention enables the provision of a substrate for a liquid filter, which has excellent collection efficiency for fine particles of less than about 10 nm together with excellent liquid permeability, and also has stable liquid permeability for long-term use.

DESCRIPTION OF EMBODIMENTS

Hereinafter, embodiments of the invention will be described in sequence. However, these descriptions and examples are illustrative of the invention, and do not limit the scope of the invention. Incidentally, throughout this Description, a numerical range using "to" includes its upper limit and lower limit. In addition, with reference to a polyolefin microporous membrane, the term "length direction" means the direction of the length of the polyolefin microporous membrane that is produced in an elongated shape, while the term "width direction" means the direction that is perpendicular to the length direction of the polyolefin microporous membrane. Hereinafter, "width direction" is sometimes also referred to as "TD", while "length direction" as "MD."

[Substrate for Liquid Filter]

The substrate for a liquid filter of the invention includes a polyolefin microporous membrane. The water permeation efficiency of the polyolefin microporous membrane is 0.10 to 0.50 ml/min·cm$^2$, and the bubble point of the polyolefin microporous membrane is 0.50 MPa or more and 0.80 MPa or less.

According to the invention as above, it is possible to provide a substrate for a liquid filter, which has excellent collection efficiency for fine particles of less than about 10 nm together with excellent liquid permeability, and also has stable liquid permeability for long-term use. Hereinafter, each element will be described in detail.

(Water Permeation Efficiency (Water Flow Rate))

The polyolefin microporous membrane, which is the substrate for a liquid filter of the invention, is characterized by its excellent flow rate characteristics. The water permeation efficiency of the polyolefin microporous membrane at a pressure differential of 90 kPa is 0.10 to 0.50 ml/min·cm$^2$. When the water permeation efficiency of the polyolefin microporous membrane is less than 0.10 ml/min·cm$^2$, sufficient water permeation efficiency as a liquid filter for particles of less than about 10 nm may not be obtained, resulting in problems, such as a decrease in the productivity of liquid filtration and an increase in the energy load required to maintain the flow volume (productivity). From such a point of view, the water permeation efficiency is more preferably 0.15 ml/min·cm$^2$ or more. Meanwhile, when the water permeation efficiency of the polyolefin microporous membrane is more than 0.50 ml/min·cm$^2$, particles of less than about 10 nm may not be sufficiently collected, resulting in the problem that sufficient collection efficiency is not exerted. From such a point of view, the water permeation efficiency is more preferably 0.40 ml/min·cm$^2$ or less.

(Bubble Point)

The polyolefin microporous membrane, which is the substrate for a liquid filter of the invention, is characterized in that particles of less than about 10 nm, or further particles of several nanometers, are collected at high level. The bubble point of the polyolefin microporous membrane is 0.50 MPa or more and 0.80 MPa or less. In the invention, when the bubble point of the polyolefin microporous membrane is less than 0.50 MPa, fine particles as mentioned above cannot be sufficiently collected, and sufficient collection efficiency is not exerted. From such a point of view, the bubble point is more preferably 0.55 MPa or more. Meanwhile, when the bubble point of the polyolefin microporous membrane is more than 0.80 MPa, the resulting water permeation efficiency may be seriously insufficient, making it impossible to achieve stable liquid permeability for long-term use. From such a point of view, the bubble point is more preferably 0.70 MPa or less.

Incidentally, in the invention, it is necessary that the above water permeation efficiency and bubble point are adjusted within appropriate ranges. Methods for controlling these properties are not particularly limit. An example thereof is the adjustment of production conditions, such as the average molecular weight of the polyethylene resin, the mixing ratio in the case where a plurality of polyethylene resins are mixed and used, the polyethylene resin concentration in the raw material, the mixing ratio in the case where a plurality of solvents are mixed and used in the raw material, the heating temperature and pressing pressure for solvent expression from the inside of an extruded sheet-like article, the draw ratio, the heat treatment (heat setting) temperature after drawing, and the immersion time in the extraction solvent, for example. In particular, as shown below in the description of the production method, they can be suitably obtained when the proportion of an ultrahigh-molecular-weight polyethylene in the entire polyethylene composition is 5 to 27 mass %, a suitable pressing pressure is applied with heating to 40 to 100° C. to express some of the solvent contained in an extruded sheet-like article, the total draw ratio is 40 to 120, or the heat set temperature is 110 to 124° C., for example.

(Heat Shrinkage)

It is preferable that the polyolefin microporous membrane, which is the substrate for a liquid filter of the invention, has a shrinkage of 15% or more in the width direction (TD) after being allowed to stand at a temperature of 120° C. for 1 hour, still more preferably 17% or more, and particularly preferably 17 to 27%. In the case where the heat shrinkage of the polyolefin microporous membrane is 15% or more, during the processing of the polyolefin microporous membrane, when the membrane is conveyed in the situation of receiving a heat treatment, excellent conveying properties are likely to be obtained without slackening; therefore, this is desirable. Meanwhile, in the case where the heat shrinkage of the polyolefin microporous membrane is 27% or less, during the processing of the polyolefin microporous membrane, when the membrane is conveyed in the situation of receiving a heat treatment, excellent conveying properties are likely to be obtained without meandering or wrinkling; therefore, this is desirable.

From a similar point of view, it is preferable that the polyolefin microporous membrane, which is the substrate for a liquid filter of the invention, has a shrinkage of 20% or more in the width direction (TD) after being allowed to stand at a temperature of 130° C. for 1 hour, still more preferably 20 to 35%, and particularly preferably 22 to 32%.

(Thickness)

The polyolefin microporous membrane, which is the substrate for a liquid filter of the invention, is thin but has excellent strength. It is preferable that the thickness thereof is 7 to 15 µm, still more preferably 8 to 14 µm. In the case where the thickness of the polyolefin microporous membrane is 7 µm or more, sufficient dynamic strength is likely to be obtained, making it easier to obtain handleability during the processing of the polyolefin microporous membrane, etc., or durability in the long-term use of a filter cartridge; therefore, this is desirable. Meanwhile, in the case where the thickness is 15 µm or less, sufficient water permeation efficiency is likely to be obtained with the microporous membrane alone. In addition, in a filter cartridge of a predetermined size, a larger filtration area can be obtained, making it easier to design the flow rate or structure of the filter during the processing of the polyolefin microporous membrane; therefore, this is desirable.

For example, assuming the placement of a filter cartridge in a housing of the same size, the thinner the filter medium (the entire components including the substrate for a filter) is, the larger the filter medium area can be, making it possible to achieve a high-flow-rate/low-filtration-pressure design, which is desirable as a liquid filter. That is, it becomes possible to design a liquid filter such that the filtration pressure decreases in the case where the same flow rate is to be maintained, while the flow rate increases in the case where the same filtration pressure is to be maintained. In particular, when the filtration pressure is low, it becomes much less likely that particles once collected are continuously exposed to the filtration pressure in the filter medium, thus are pushed out from the inside of the filter medium with the lapse of time together with the filtrate, and leak out. It also becomes much less likely that gas dissolved and present in the liquid to be filtered appears in the form of fine bubbles due to the pressure difference before and after filtration (pressure decrease after filtration). Further, this can also be expected to be effective in improving the filtration yield of the filtration object, such as a liquid chemical, and also maintaining its quality at high level over a long period of time.

Meanwhile, although the strength and durability of a filter medium decrease with a decrease in the thickness thereof, for example, if possible in designing a filter, it is also possible to combine the filter with a coarse high-strength support for reinforcement (e.g., processing to stack them and fold the stack) to adjust the designing of durability and flow rate.

(Tensile Elongation)

It is preferable that the polyolefin microporous membrane has a tensile elongation of more than 55% and 200% or less in the length direction (MD). When the tensile elongation of the polyolefin microporous membrane is 55% or more, the impact resulting from changes in the filtration pressure in a liquid filter can be suitably absorbed, and, for example, the rupture resistance is less likely to decrease in long-term use, which is desirable in terms of life. From such a point of view, the tensile elongation is more preferably 60% or more.

Meanwhile, when the tensile elongation of the polyolefin microporous membrane is 200% or less, the filter medium is less likely to elongate due to changes in the filtration pressure, and this prevents problems including, for example, the leakage of collected particles upon an increase in the filtration pressure, the extreme narrowing of the distance between adjacent filter media, resulting in an excessive increase in the filtration pressure to make the flow rate of the liquid filter insufficient, etc. From such a point of view, the tensile elongation is more preferably 185% or less, and still more preferably 170% or less. Incidentally, methods for adjusting tensile elongation within such a range are the same as mentioned above for methods for controlling water permeation efficiency and a bubble point.

(Cushion Factor)

It is preferable that the polyolefin microporous membrane, which is the substrate for a liquid filter of the invention, has a cushion factor of more than 30%.

In the case where the cushion factor of the polyolefin microporous membrane is more than 30%, the impact due to changes in the filtration pressure in a filter can be absorbed, resulting in improved rupture resistance; therefore, this is desirable. From such a point of view, the cushion factor is more preferably 35% or more. Meanwhile, it is preferable that the cushion factor of the polyolefin microporous membrane is 65% or less. In the case where the cushion factor is 65% or less, excessive thickness changes due to changes in the filtration pressure change are suppressed, whereby through-pores in the thickness direction can be maintained, and the water permeation efficiency can be maintained within an appropriate range; therefore, this is desirable. From such a point of view, the cushion factor is more preferably 60% or less.

(Pore-Blocking Temperature)

It is preferable that the polyolefin microporous membrane, which is the substrate for a liquid filter of the invention, has a pore-blocking temperature of more than 140° C. In the case where the pore-blocking temperature of the polyolefin microporous membrane is more than 140° C., in the thermal bonding step during the processing of the polyolefin microporous membrane, near the high-temperature processing part or near the high-temperature-body contacting part, the porousness of the polyolefin microporous membrane is not lost, and the water permeation efficiency is maintained, whereby the desired filtration area is more likely to be obtained even after the processing; therefore, this is desirable.

(Compressibility)

It is preferable that the polyolefin microporous membrane, which is the substrate for a liquid filter of the invention, has a compressibility of less than 15% when pressed at a temperature at 70° C. at 2 MPa for 30 seconds, more preferably 12% or less. In the case where the compressibility of the polyolefin microporous membrane is less than 15%, in long-term use or in a hot-pressing (bonding) step during processing into a filter, for example, the polyolefin microporous membrane is not needlessly crushed, and the original porous structure can be maintained; therefore, this is desirable. Here, compressibility in the invention is determined as follows. A polyolefin microporous membrane is pressed at a temperature of 70° C. at 2 MPa for 30 seconds, and then the pressure is released at 25° C. for 30 seconds, followed by allowing to stand; from the difference in membrane thickness before and after pressing and also the ratio of the membrane thickness before pressing, the compressibility is determined.

Incidentally, methods for controlling compressibility are not particularly limited. For example, it can be controlled by the average molecular weight of the polyolefin resin, the mixing ratio in the case where a plurality of polyolefin resins are mixed and used, the polyolefin resin concentration in the raw material, the mixing ratio in the case where a plurality of solvents are mixed and used in the raw material, the heating temperature and pressing pressure for solvent expression from the inside of an extruded sheet-like article, the draw ratio, the heat treatment (heat setting) temperature after drawing, the immersion time in the extraction solvent, the annealing treatment temperature and treatment time, etc.
(Porosity)

It is preferable that the polyolefin microporous membrane, which is the substrate for a liquid filter of the invention, has a porosity of 46 to 54%, more preferably 47% to 53%. In the case where the porosity of the polyolefin microporous membrane is 46% or more, this results in excellent water permeation efficiency and thus is desirable. Meanwhile, in the case where the porosity is 54% or less, this provides the polyolefin microporous membrane with excellent dynamic strength and improved handleability, and thus is desirable. Here, the porosity ($\varepsilon$) of a polyolefin microporous membrane is calculated by the following equation.

$$\varepsilon(\%)=\{1-Ws/(ds \cdot t)\} \times 100$$

Ws: Weight per unit of polyolefin microporous membrane (g/m$^2$)

ds: True density of polyolefin (g/cm$^3$)

t: Thickness of polyolefin microporous membrane (μm)
(Ratio of Tensile Elongation in Length Direction to Tensile Elongation in Width Direction)

It is preferable that the ratio of the tensile elongation in the length direction (MD) to that in the width direction (TD) (MD tensile elongation/TD tensile elongation) of the polyolefin microporous membrane, which is the substrate for a liquid filter of the invention, is 0.8 to 4.0, still more preferably 1.0 to 3.5. When the MD tensile elongation/TD tensile elongation is 0.8 or more, during the processing of the polyolefin microporous membrane, the tension for stretching the microporous membrane in the width direction is stabilized, making it easier to handle; therefore, this is desirable. Meanwhile, when the MD tensile elongation/TD tensile elongation is 4.0 or less, during the processing of the polyolefin microporous membrane, wrinkling caused by the elongation of the microporous membrane in the length direction due to the load of conveying tensile force can be suppressed, making it easier to handle; therefore, this is desirable.
(Polyolefin)

The polyolefin microporous membrane, which is the substrate for a liquid filter of the invention, is a microporous membrane that contains a polyolefin. Here, "microporous membrane" means a membrane having a large number of micropores inside and configured such that the micropores are connected to each other, through which gas or liquid can pass from one side to the other side. It is preferable that the polyolefin microporous membrane has a polyolefin content of 90 mass % or more. As the remainder, organic or inorganic fillers, surfactants, and like additives may also be contained without affecting the advantageous effects of the invention.

Examples of polyolefins are homopolymers and copolymers of polyethylene, polypropylene, polybutylene, and polymethylpentene, mixtures of one or more kinds thereof, etc. Among them, polyethylene is preferable. As polyethylene, it is preferable to use a high-density polyethylene, a mixture of a high-density polyethylene and an ultrahigh-molecular-weight polyethylene, or the like. In addition, it is also possible to use polyethylene in combination with other components. Examples of components other than polyethylene include polypropylene, polybutylene, polymethylpentene, and copolymers of polypropylene and polyethylene. In addition, as a polyolefin, it is possible to use a combination of a plurality of polyolefins that are poorly compatible with each other and have different degrees of polymerization and branching, in other words, a plurality of polyolefins that are different in crystallinity, stretchability, and molecular orientation.

As a polyolefin for use in the invention, it is preferable to use a polyethylene composition containing 5 mass % or more of an ultrahigh-molecular-weight polyethylene having a mass average molecular weight of 900,000 or more, still more preferably a composition containing 7 mass % or more of an ultrahigh-molecular-weight polyethylene, and particularly preferably a composition containing 13 to 27 mass % or more of an ultrahigh-molecular-weight polyethylene. In addition, when suitable amounts of two or more kinds of polyethylene are blended, upon drawing, this is effective in forming a network web structure associated with fibrillation and increasing the occurrence of pores. It is preferable that the mass average molecular weight after the blending of two or more kinds of polyethylene is 350,000 to 4,500,000, more preferably 350,000 to 2,500,000. In particular, a polyethylene composition obtained by mixing an ultrahigh-molecular-weight polyethylene having a mass average molecular weight of 900,000 or more as mentioned above with a high-density polyethylene having a mass average molecular weight of 200,000 to 800,000 and a density of 0.92 to 0.96 g/cm$^3$ is preferable. In this case, it is preferable that the proportion of the high-density polyethylene in the polyethylene composition is 95 mass % or less, still more preferably 93 mass % or less, and particularly preferably 73 to 87 mass %.

Incidentally, the mass average molecular weight can be determined as follows. A polyolefin microporous membrane sample is dissolved by heating in o-dichlorobenzene, and subjected to measurement by GPC (Alliance GPC 2000 manufactured by Waters Corporation, columns; GMH6-HT and GMH6-HTL) under the conditions of a column temperature of 135° C. and a flow velocity of 1.0 mL/min.
[Liquid Filter]

The substrate for a liquid filter of the invention mentioned above is, after suitable processing to impart compatibility with liquid chemicals, processed into a cartridge form, which can be used as a liquid filter. A liquid filter is an instrument for removing particles from a liquid to be treated containing particles made of organic substances and/or inorganic substances. In the liquid to be treated, particles are present in the form of a solid or a gel. The invention is suitable for the removal of particles having a particle size of less than about 10 nm, or further several nanometers. In addition, in addition to the semiconductor production step, the liquid filter may also be used in other production steps, such as display production and polishing, for example.

As a substrate for a liquid filter, a porous substrate made of polytetrafluoroethylene or polypropylene is well known, for example. The substrate of the invention mentioned above, which is composed of the polyolefin microporous membrane, has higher compatibility with liquid chemicals as compared with polytetrafluoroethylene porous substrates. Accordingly, the processing to impart compatibility with liquid chemicals to the filter is facilitated, for example. In addition, when the filter cartridge is placed in a filter housing, and the housing is filled with a liquid chemical, an air pocket is unlikely to be formed in the filter cartridge, resulting in improved yield of liquid chemical filtration. Further, because a polyethylene resin itself does not contain a halogen element, the used filter cartridge is easy to handle, which is effective in reducing the environmental impact, for example.

[Polyolefin Microporous Membrane Production Method]

The polyolefin microporous membrane, which is the substrate for a liquid filter of the invention, can be suitably produced by the method shown below. That is, it can be suitably produced by sequentially performing the following steps:

(I) a step of, in a solution containing a polyethylene composition and a solvent, preparing a solution containing a volatile solvent having a boiling point of less than 210° C. at least at atmospheric pressure;

(II) a step of melt-kneading the solution, extruding the obtained melt-kneaded article from a die, and cooling and solidifying the same to give a gel-like molded article;

(III) a step of, prior to drawing the gel-like molded article in at least one direction, expressing some of the solvent from the gel-like molded article;

(IV) a step of drawing the gel-like molded article in at least one direction; and (V) a step of extracting and washing the solvent from the inside of the drawn intermediate molded article.

In the step (I), in which a solution containing a polyethylene composition and a solvent is prepared, a solution containing a volatile solvent having a boiling point of less than 210° C. at least at atmospheric pressure is prepared. Here, it is preferable that the solution is a thermally reversible sol-gel solution. That is, the polyethylene is dissolved by heating in the solvent to form a sol, thereby preparing a thermally reversible sol-gel solution. The volatile solvent having a boiling point of less than 210° C. at atmospheric pressure in the step (I) is not particularly limited as long as it is capable of sufficiently swelling or dissolving polyethylene. Preferred examples thereof include liquid solvents, such as tetralin, ethylene glycol, decalin, toluene, xylene, diethyltriamine, ethylenediamine, dimethyl sulfoxide, and hexane. They may be used alone, and it is also possible to use a combination of two or more kinds. Among them, decalin and xylene are preferable.

In addition, in the preparation of the solution, in addition to the volatile solvent having a boiling point of less than 210° C. at atmospheric pressure mentioned above, it is also possible to add a non-volatile solvent having a boiling point of 210° C. or more, such as liquid paraffin, paraffin oil, mineral oil, or castor oil.

In the solution in the step (I), in terms of controlling the liquid permeation efficiency of the polyolefin microporous membrane and the removal efficiency as a filter medium, it is preferable that the concentration of the polyethylene composition is 25 to 45 mass %, still more preferably 25 to 40 mass %. In addition, with a decrease in the concentration of the polyethylene composition, the dynamic strength tends to decrease, resulting in poor handleability, and further, in the formation of a polyolefin microporous membrane, breakage tends to occur more frequently. In addition, with an increase in the concentration of the polyethylene composition, it tends to be more difficult to form pores.

In the step (II), the solution prepared in the step (I) is melt-kneaded, the obtained melt-kneaded article is extruded from a die, and then cooled and solidified to give a gel-like molded article. It is preferable that extrusion from a die is performed at a temperature within a range of the melting point of the polyethylene composition to the melting point+65° C. to give an extruded article, and then the extruded article is cooled to give a gel-like molded article.

It is preferable that the molded article is formed into a sheet shape. Cooling may be quenching with an aqueous solution or an organic solvent, or may also be casting on a cooled metallic roll. However, generally, quenching with water or the volatile solvent used for the sol-gel solution is employed. It is preferable that the cooling temperature is 10 to 40° C. Incidentally, it is preferable that a stream of water is established on the surface layer of a water bath, and a gel-like sheet is produced while preventing the mixed solvent released from a gelled sheet in the water bath and floating on the water surface from re-adhering to the sheet.

The step (III) is a step of, prior to drawing the gel-like molded article in at least one direction, expressing some of the solvent from the gel-like molded article. The step (III) can be suitably performed by, for example, applying pressure to the surface of the gel-like molded article by a method in which the article is passed through the gap between upper and lower two belts or rollers, etc. The amount of solvent to be expressed has to be adjusted according to the required liquid permeation efficiency and filtration object removal efficiency of the polyolefin microporous membrane. Such adjustment can be made within an appropriate range with the pressing pressure between the upper and lower belts or rollers, the temperature in the expression step, the number of presses, etc.

Incidentally, the pressure that the gel-like molded article receives is preferably adjusted to be 0.1 to 2.0 MPa in the case of using sheet-like objects such as belts. In the case of using rollers or the like, it is preferably performed at 2 to 45 kgf/m. It is preferable that the expression temperature is 40 to 100° C. In addition, the number of presses depends on the space allowance in the facility, and thus pressing can be performed without particular limitation.

In the step (III), as necessary, single-stage or multistage preheating may be performed before solvent expression to remove some of the volatile solvent from the inside of the sheet. In this case, it is preferable that the preheating temperature is 50 to 100° C.

The step (IV) is a step of drawing the gel-like molded article in at least one direction. Here, it is preferable that drawing in the step (IV) is biaxial drawing. Either of sequential biaxial drawing, in which longitudinal drawing and transverse drawing are separately performed, and simultaneous biaxial drawing, in which longitudinal drawing and transverse drawing are simultaneously performed, can be suitably employed. In addition, a method in which the article is drawn in the longitudinal direction several times and then drawn in the transverse direction, a method in which the article is drawn in the longitudinal direction and drawn in the transverse direction several times, and a method in which the article is sequentially biaxially drawn and then further drawn in the longitudinal direction and/or in the transverse direction once or several times are also preferable.

In terms of controlling the liquid permeation efficiency and filtration object removal efficiency of the polyolefin microporous membrane, it is preferable that the total draw ratio in the step (IV) (the product of the longitudinal draw ratio and the transverse draw ratio) is 40 to 120, more preferably 50 to 100. With an increase in the draw ratio, in the formation of a polyolefin microporous membrane, breakage tends to occur more frequently. In addition, with a decrease in the draw ratio, the thickness tends to be less uniform. As mentioned above, it is preferable that drawing is performed with the solvent remaining in a suitable state. It is preferable that the drawing temperature is 80 to 125° C.

In addition, after drawing in the step (IV), a heat set treatment may be performed. In terms of controlling the liquid permeation efficiency and removal efficiency of the polyolefin microporous membrane, it is preferable that the heat set temperature is 110 to 124° C. With an increase in the heat set temperature, the removal efficiency of the polyolefin microporous membrane tends to significantly decrease, while with a decrease in the heat set temperature, the liquid permeation efficiency tends to significantly decrease.

The step (V) is a step of extracting and washing the solvent from the inside of the drawn intermediate molded article. Here, in the step (V), in order to extract the solvent from the inside of the drawn intermediate molded article (drawn film), it is preferable that washing is performed with a halogenated hydrocarbon solvent such as methylene chloride or a hydrocarbon solvent such as hexane. In the case where washing is performed by immersion in a tank filled with a solvent, in order to obtain a polyolefin microporous membrane with low dissolution, it is preferable that washing is performed for 20 to 150 seconds, more preferably 30 to 150 seconds, and particularly preferably 30 to 120 seconds. Further, in order to further enhance the effect of washing, it is preferable that the tank is divided into several stages, and the washing solvent is poured from the downstream side of the step of conveying the polyolefin microporous membrane for the washing solvent to flow towards the upstream side of the conveying step so that the purity of the washing solvent in a downstream tank will be higher than in an upstream tank. In addition, depending on the performance requirements for the polyolefin microporous membrane, heat setting may be performed by an annealing treatment. Incidentally, in terms of conveying properties in the step, etc., it is preferable that the annealing treatment is performed at 50 to 150° C., still more preferably 50 to 140° C.

As a result of such a production method, a low-dissolution polyolefin microporous membrane having excellent liquid permeation efficiency and removal efficiency can be provided.

EXAMPLES

Hereinafter, examples of the invention, comparative examples, and various measurement methods will be described. However, the invention is not limited to these examples.

[Measurement Methods]
(Water Permeation Efficiency (Water Flow Rate))

A polyolefin microporous membrane was pre-immersed in ethanol and dried at room temperature. This polyolefin microporous membrane was set on a 37-mm-diameter liquid permeation cell made of stainless steel (liquid permeation area: S cm$^2$). The polyolefin microporous membrane on the liquid permeation cell was wetted with a small amount (0.5 ml) of ethanol. Then, pre-weighed pure water V (100 ml) was passed therethrough at a pressure differential of 90 kPa, and the time T1 (min) taken for the entire amount of pure water to pass was measured. From the amount of pure water and the time taken for the passing of pure water, the water penetration volume Vs per unit time (min) and unit area (cm$^2$) at a pressure differential of 90 kPa was calculated from the following equation and defined as water permeation efficiency (ml/min·cm$^2$). The measurement was performed in a temperature atmosphere at room temperature 24° C.

$$Vs = V/(T1 \times S)$$

(Bubble Point)

The bubble point of a polyolefin microporous membrane was measured in accordance with ASTM E-128-61 using ethanol as the measurement solvent.

(Heat Shrinkage)

A polyolefin microporous membrane was cut to a size of 100 mm in width×100 mm in length such that each side is parallel to the length direction (MD) or the width direction (TD), and allowed to stand in an oven adjusted to a temperature of 120° C. or 130° C. for 1 hour. The resulting shrinkage in the width direction (TD) (dimensional change) was calculated by the following equation.

Heat shrinkage (%)=(|dimension before heat treatment−dimension after heat treatment|/dimension before heat treatment)×100

(Thickness)

A polyolefin microporous membrane was measured for thickness at 20 points using a contact thickness gauge (manufactured by Mitutoyo Corporation), and the results were averaged to determine the thickness. Here, as a contact terminal, a terminal in a cylindrical shape with a 0.5-cm-diameter bottom was used. The measurement pressure was 0.1 N.

(Tensile Elongation)

A polyolefin microporous membrane was cut along the MD and TD directions to form strip-like specimens (15 mm in width and 50 mm in length), respectively. Each strip-like specimen was pulled using a tensile tester (RTE-1210 manufactured by Orientec Co., Ltd.) at a speed of 200 mm/min, and the tensile elongation at the breakage of the specimen was measured.

(Cushion Factor)

In the measurement of the thickness of a polyolefin microporous membrane using a dial gauge (manufactured by Mitutoyo Company) having a 10-mm-diameter flat standard gauge head attached thereto, the thickness T1 (μm) under a load of 50 g and the thickness T2 (μm) under a load of 500 g were measured, and the cushion factor was determined by the following equation. Incidentally, the thickness was measured 30 seconds after the application of the load. The measurement was performed at 10 different points, and their average was used.

Cushion factor (%)=(1−$T2/T1$)×100

(Pore-Blocking Temperature)

A cut polyolefin microporous membrane substrate was immersed in a methanol solution containing 3 mass % of a nonionic surfactant (manufactured by Kao Corporation; EMULGEN 210P) dissolved therein, followed by air-drying. The air-dried sample was sandwiched between SUS plates having a predetermined size, impregnated with 1 M LiBF$_4$ propylene carbonate/ethylene carbonate (mass ratio: 1/1), which is an electrolyte, and then enclosed in a 2032-type coin cell. Leads were connected to the coin cell, a thermocouple was attached thereto, and the coin cell was placed in an oven. While raising the temperature at a temperature rise rate of 1.6° C./min, the resistance of the cell was measured by an AC impedance method at an amplitude of 10 mV and a frequency of 100 kHz. The temperature at the time when the resistance reached 1000 Ω·cm$^2$ was defined as the pore-blocking temperature.

(Compressibility (Rate of Change of Membrane Thickness Before and after Pressing))

A polyolefin microporous membrane sample was cut to 47 mm×100 mm and pressed at a temperature condition of 70° C. at 2 MPa for 30 seconds. The thickness of the sample before pressing (pre-t) was measured, and the thickness of the sample allowed to stand at 25° C. for 30 minutes after pressing (post-t) was measured. From these thicknesses, the compressibility was calculated by the following equation. Incidentally, the thickness of the sample was measured using a contact thickness gauge (manufactured by Mitutoyo Corporation, terminal diameter; 0.5 cm, terminal shape; cylindrical, measurement pressure; 0.1 N) at ambient temperature 24±2° C.

$$\text{Compressibility} = \{(\text{pre-}t - \text{post-}t)/\text{pre-}t\} \times 100 (\%)$$

(Porosity)

The porosity ($\varepsilon$) of a polyolefin microporous membrane was calculated by the following equation.

$$\varepsilon(\%) = \{1 - Ws/(ds \cdot t)\} \times 100$$

Ws: Weight per unit of polyolefin microporous membrane ($g/m^2$)

ds: True density of polyolefin ($g/cm^3$)

t: Thickness of polyolefin microporous membrane ($\mu m$)

Incidentally, the weight per unit of a polyolefin microporous membrane was determined as follows. A sample of 10 cm×10 cm was cut out, the mass thereof was measured, and the mass was divided by the area to determine the weight per unit.

(Collection Efficiency)

100 ml of an aqueous solution containing 0.0045 mass % of a gold colloid (average particle size: 3 nm) was filtered through a polyolefin microporous membrane at a pressure differential of 10 kPa. From the difference between the mass of the 100-ml aqueous gold colloid solution before filtration (M1) and the mass of the filtrate that had passed through the polyolefin microporous membrane (M2), the collection efficiency for the gold colloid was determined. Incidentally, a collection efficiency of 90% or more was rated as the best (AA), 80% or more and less than 90% as good (A), and less than 80% as poor (B).

$$\text{Collection efficiency } (\%) = ((M1 - M2)/((M1 \times 45 \times 10^{-6})) \times 100$$

(Rate of Change of Water Penetration Volume (Flow Stability))

A polyolefin microporous membrane was pre-immersed in ethanol and dried at room temperature. Five of the polyolefin microporous membranes were set on a 37-mm-diameter liquid permeation cell made of stainless steel (liquid permeation area: S $cm^2$) on top of one another at 0.5-mm intervals. The polyolefin microporous membranes on the liquid permeation cell were wetted with a small amount (0.5 ml) of ethanol. Then, 200 ml of pure water was passed therethrough at a pressure differential of 40 kPa, and the time taken for the entire amount to pass (T1) was measured, immediately followed by the release of the pressure differential. Subsequently, using the same sample, the operation of passing 200 ml of pure water at a pressure differential of 40 kPa and then immediately releasing the pressure differential was repeated 100 times. The time taken by the $100^{th}$ passing of 200 ml of pure water (T100) was measured, and the rate of change of water penetration volume (%) was calculated from the following equation. Incidentally, a rate of change of water penetration volume of 10% or less was rated as the best (AA), more than 10% and 15% or less as good (A), and more than 15% as poor (B). Incidentally, it can also be understood that when the membrane is good in terms of the rate of change of water penetration volume, an excellent porous structure can be maintained for long-term use.

$$\text{Rate of change of water penetration volume } (\%) = (T100 - T1)/T1 \times 100$$

(Rupture Resistance)

A polyolefin microporous membrane was pre-immersed in ethanol and dried at room temperature. Three of the polyolefin microporous membranes were set on a 37-mm-diameter liquid permeation cell made of stainless steel (liquid permeation area: S $cm^2$) on top of one another at 1.0-mm intervals, and 100 ml of ethanol was passed therethrough at a pressure differential of 30 kPa. After the entire amount had passed, the pressure differential was immediately released. Subsequently, using the same sample, the operation of passing 100 ml of ethanol at a pressure differential of 30 kPa and then immediately releasing the pressure differential was repeated 200 times. When no rupture occurred during the operation, the rupture resistance was rated as good (A), while when rupture occurred during the operation, the rupture resistance was rated as poor (B). Incidentally, it can also be understood that when the membrane has good rupture resistance, an excellent porous structure can be maintained for long-term use.

(Dissolution Resistance)

A polyolefin microporous membrane was immersed in methylene chloride for a predetermined period of time, then the polyolefin microporous membrane was removed, and the mass of the methylene chloride solution after immersion was measured. Separately from this, new methylene chloride having the same mass as the measured mass was prepared. Methylene chloride was evaporated from each to completely remove the solvent (to dryness), and then the mass of each was measured. Based on the mass increment after the complete removal of new methylene chloride, the ratio of the mass increment after subjecting the methylene chloride solution, in which the polyolefin microporous membrane had been immersed, to evaporation to dryness was calculated. When the ratio was 1.05 or less, the dissolution resistance was rated as good (the filtrate was not contaminated, A), while when it was more than 1.05, the dissolution resistance was rated as poor (B).

Example 1

A polyethylene composition obtained by mixing 5 parts by mass of an ultrahigh-molecular-weight polyethylene having a mass average molecular weight of 4,600,000 (PE1) and 23 parts by mass of a high-density polyethylene having a mass average molecular weight of 560,000 (PE2) was used. A pre-prepared mixed solvent of 69 parts by mass of liquid paraffin and 3 parts by mass of decalin (decahydronaphthalene) was mixed with the polyethylene composition to a total polyethylene resin concentration of 28 mass %, thereby preparing a polyethylene solution.

The polyethylene solution was extruded from a die into a sheet shape at a temperature of 160° C., and then the extruded article was cooled in a water bath at 25° C. At the same time, a stream of water was established on the surface layer of the water bath, and a gel-like sheet (base tape) was produced while preventing the mixed solvent released from a gelled sheet in the water bath and floating on the water surface from re-adhering to the sheet. The base tape was dried at 55° C. for 10 minutes and further at 95° C. for 10 minutes to remove decalin from the inside of the base tape. Subsequently, the base tape was conveyed on a roller heated to 85° C. while applying a pressing pressure of 20 kgf/m thereto, thereby removing some of liquid paraffin from the inside of the base tape. Subsequently, the base tape was drawn in the length direction at a temperature of 100° C. to 5.8 times the original length and successively drawn in the width direction at a temperature of 100° C. to 14 times the original length, immediately followed by a heat treatment (heat setting) at 118° C.

Next, the resulting drawn film was immersed in a two-tank methylene chloride bath successively for 30 seconds per tank, thereby extracting liquid paraffin. Incidentally, defining the tank where immersion is started as a first tank, and the tank where immersion is finished as a second tank, the purity of the washing solvent is (lower) first tank<second tank (higher). Subsequently, methylene chloride was removed by drying at 45° C., and the base tape was annealed while being conveyed on a roller heated to 110° C. to give a polyolefin microporous membrane.

The obtained polyolefin microporous membrane had excellent collection efficiency such that the rate of collection of gold colloid particles having a particle size of 3 nm was 90% or more, and also had excellent liquid permeability and flow stability.

The above production conditions are shown in Table 1, and the properties of the obtained polyolefin microporous membrane are shown in Table 2. Incidentally, the data of the following examples and comparative examples are also summarized in Tables 1 to 4.

Example 2

A polyolefin microporous membrane was obtained in the same manner as in Example 1, except that the base tape was conveyed on a roller heated to 40° C. while applying a pressing pressure of 40 kgf/m thereto, thereby removing some of liquid paraffin from the inside of the base tape, and then the base tape was drawn in the length direction at a temperature of 90° C. to 5.8 times the original length and successively drawn in the width direction at a temperature of 90° C. to 14 times the original length, immediately followed by a heat treatment (heat setting) at 124° C.

The obtained polyolefin microporous membrane had excellent collection efficiency such that the rate of collection of gold colloid particles having a particle size of 3 nm was 80% or more, and also had excellent liquid permeability and flow stability.

Example 3

A polyolefin microporous membrane was obtained in the same manner as in Example 1, except that the base tape was conveyed on a roller heated to 95° C. while applying a pressing pressure of 5 kgf/m thereto, thereby removing some of liquid paraffin from the inside of the gel-like sheet, and then the base tape was drawn in the length direction at a temperature of 95° C. to 6.5 times the original length and successively drawn in the width direction at a temperature of 95° C. to 13 times the original length, immediately followed by a heat treatment (heat setting) at 114° C.

The obtained polyolefin microporous membrane had excellent collection efficiency such that the rate of collection of gold colloid particles having a particle size of 3 nm was 90% or more, and also had excellent liquid permeability and flow stability.

Example 4

A polyolefin microporous membrane was obtained in the same manner as in Example 1, except that using a polyethylene composition obtained by mixing 4 parts by mass of an ultrahigh-molecular-weight polyethylene having a mass average molecular weight of 4,600,000 (PE1) and 31 parts by mass of a high-density polyethylene having a mass average molecular weight of 560,000 (PE2), a pre-prepared mixed solvent of 55 parts by mass of liquid paraffin and 10 parts by mass of decalin (decahydronaphthalene) was mixed with the polyethylene composition to a total polyethylene resin concentration of 35 mass %, thereby preparing a polyethylene solution, and a gel-like sheet obtained by extrusion was drawn in the length direction to 5 times the original length and in the transverse direction to 9 times the original length, immediately followed by a heat treatment (heat setting) at 114° C.

The obtained polyolefin microporous membrane had excellent collection efficiency such that the rate of collection of gold colloid particles having a particle size of 3 nm was 90% or more, and also had excellent liquid permeability and flow stability.

Example 5

A polyolefin microporous membrane was obtained in the same manner as in Example 1, except that using a polyethylene composition obtained by mixing 8 parts by mass of an ultrahigh-molecular-weight polyethylene having a mass average molecular weight of 4,600,000 (PE1) and 24 parts by mass of a high-density polyethylene having a mass average molecular weight of 560,000 (PE2), a pre-prepared mixed solvent of 53 parts by mass of liquid paraffin and 15 parts by mass of decalin (decahydronaphthalene) was mixed with the polyethylene composition to a total polyethylene resin concentration of 32 mass %, thereby preparing a polyethylene solution, and a gel-like sheet obtained by extrusion was drawn in the length direction to 4 times the original length and in the transverse direction to 15 times the original length.

The obtained polyolefin microporous membrane had excellent collection efficiency such that the rate of collection of gold colloid particles having a particle size of 3 nm was 90% or more, and also had excellent liquid permeability and flow stability.

Example 6

A polyethylene composition obtained by mixing 6 parts by mass of an ultrahigh-molecular-weight polyethylene having a mass average molecular weight of 4,600,000 (PE1) and 22 parts by mass of a high-density polyethylene having a mass average molecular weight of 560,000 (PE2) was used. A pre-prepared mixed solvent of 69 parts by mass of liquid paraffin and 3 parts by mass of decalin (decahydronaphthalene) was mixed with the polyethylene composition to a total polyethylene resin concentration of 28 mass %, thereby preparing a polyethylene solution.

The polyethylene solution was extruded from a die into a sheet shape at a temperature of 160° C., and then the extruded article was cooled in a water bath at 25° C. At the same time, a stream of water was established on the surface layer of the water bath, and a gel-like sheet (base tape) was produced while preventing the mixed solvent released from a gelled sheet in the water bath and floating on the water surface from re-adhering to the sheet. The base tape was dried at 55° C. for 10 minutes and further at 95° C. for 10 minutes to remove decalin from the inside of the base tape. Subsequently, the base tape was conveyed on a roller heated to 85° C. while applying a pressing pressure of 20 kgf/m thereto, thereby removing some of liquid paraffin from the inside of the base tape. Subsequently, the base tape was drawn in the length direction at a temperature of 100° C. to 5.8 times the original length and successively drawn in the width direction at a temperature of 100° C. to 14 times the original length, immediately followed by a heat treatment (heat setting) at 118° C.

Next, the resulting drawn film was immersed in a two-tank methylene chloride bath successively for 30 seconds per tank, thereby extracting liquid paraffin. Incidentally, defining the tank where immersion is started as a first tank, and the tank where immersion is finished as a second tank, the purity of the washing solvent was (lower) first tank<second tank (higher). Subsequently, methylene chloride was removed by drying at 45° C., and the base tape was annealed while being conveyed on a roller heated to 110° C. to give a polyolefin microporous membrane.

The obtained polyolefin microporous membrane had excellent collection efficiency such that the rate of collection of gold colloid particles having a particle size of 3 nm was 90% or more, and also had excellent liquid permeability and rupture resistance.

Example 7

A polyolefin microporous membrane was obtained in the same manner as in Example 6, except that the base tape was conveyed on a roller heated to 40° C. while applying a pressing pressure of 40 kgf/m thereto, thereby removing some of liquid paraffin from the inside of the base tape, and then the base tape was drawn in the length direction at a temperature of 90° C. to 5.8 times the original length and successively drawn in the width direction at a temperature of 90° C. to 14 times the original length, immediately followed by a heat treatment (heat setting) at 124° C.

The obtained polyolefin microporous membrane had excellent collection efficiency such that the rate of collection of gold colloid particles having a particle size of 3 nm was 80% or more, and also had excellent liquid permeability and rupture resistance.

Example 8

A polyolefin microporous membrane was obtained in the same manner as in Example 6, except that the base tape was conveyed on a roller heated to 95° C. while applying a pressing pressure of 5 kgf/m thereto, thereby removing some of liquid paraffin from the inside of the base tape, and then the base tape was drawn in the length direction at a temperature of 95° C. to 6.5 times the original length and successively drawn in the width direction at a temperature of 95° C. to 13 times the original length, immediately followed by a heat treatment (heat setting) at 114° C.

The obtained polyolefin microporous membrane had excellent collection efficiency such that the rate of collection of gold colloid particles having a particle size of 3 nm was 90% or more, and also had excellent liquid permeability and rupture resistance.

Example 9

A polyolefin microporous membrane was obtained in the same manner as in Example 6, except that using a polyethylene composition obtained by mixing 5 parts by mass of an ultrahigh-molecular-weight polyethylene having a mass average molecular weight of 4,600,000 (PE1) and 30 parts by mass of a high-density polyethylene having a mass average molecular weight of 560,000 (PE2), a pre-prepared mixed solvent of 55 parts by mass of liquid paraffin and 10 parts by mass of decalin (decahydronaphthalene) was mixed with the polyethylene composition to a total polyethylene resin concentration of 35 mass %, thereby preparing a polyethylene solution, and a gel-like sheet obtained by extrusion was drawn in the length direction to 5 times the original length and in the transverse direction to 9 times the original length, immediately followed by a heat treatment (heat setting) at 114° C.

The obtained polyolefin microporous membrane had excellent collection efficiency such that the rate of collection of gold colloid particles having a particle size of 3 nm was 90% or more, and also had excellent liquid permeability and rupture resistance.

Example 10

A polyolefin microporous membrane was obtained in the same manner as in Example 6, except that using a polyethylene composition obtained by mixing 8 parts by mass of an ultrahigh-molecular-weight polyethylene having a mass average molecular weight of 4,600,000 (PE1) and 22 parts by mass of a high-density polyethylene having a mass average molecular weight of 560,000 (PE2), a pre-prepared mixed solvent of 55 parts by mass of liquid paraffin and 15 parts by mass of decalin (decahydronaphthalene) was mixed with the polyethylene composition to a total polyethylene resin concentration of 30 mass %, thereby preparing a polyethylene solution, and a gel-like sheet obtained by extrusion was drawn in the length direction to 4 times the original length and in the transverse direction to 15 times the original length.

The obtained polyolefin microporous membrane had excellent collection efficiency such that the rate of collection of gold colloid particles having a particle size of 3 nm was 90% or more, and also had excellent liquid permeability and rupture resistance.

Comparative Example 1

A polyethylene composition obtained by mixing 5 parts by mass of an ultrahigh-molecular-weight polyethylene having a mass average molecular weight of 4,600,000 (PE1) and 20 parts by mass of a high-density polyethylene having a mass average molecular weight of 560,000 (PE2) was used. A pre-prepared mixed solvent of 70 parts by mass of liquid paraffin and 5 parts by mass of decalin (decahydronaphthalene) was mixed with the polyethylene composition to a total polyethylene resin concentration of 25 mass %, thereby preparing a polyethylene solution.

The polyethylene solution was extruded from a die into a sheet shape at a temperature of 148° C., and then the extruded article was cooled in a water bath at 20° C. to give a gel-like sheet (base tape). The base tape was dried at 60° C. for 8 minutes and further at 95° C. for 15 minutes to remove decalin from the inside of the sheet. Subsequently, the base tape was drawn in the length direction at a temperature of 90° C. to 6 times the original length and successively drawn in the width direction at a temperature of 105° C. to 9 times the original length, immediately followed by a heat treatment (heat setting) at 126° C.

Next, the resulting drawn film was immersed in a methylene chloride bath for 10 seconds to extract liquid paraffin. Subsequently, methylene chloride was removed by drying at 50° C., and the base tape was annealed while being conveyed on a roller heated to 120° C. to give a polyolefin microporous membrane.

The obtained polyolefin microporous membrane had a low bubble point, excessively high water permeation efficiency, and insufficient collection efficiency such that the rate of collection of gold colloid particles having a particle size of 3 nm was less than 80%.

Comparative Example 2

A polyethylene composition obtained by mixing 10 parts by mass of an ultrahigh-molecular-weight polyethylene having amass average molecular weight of 4,600,000 (PE1) and 24 parts by mass of a linear low-density polyethylene having a mass average molecular weight of 350,000 (PE2) was used. A pre-prepared powder dispersion solution containing 45 parts by mass of liquid paraffin with 21 parts by mass of an inorganic powder (pulverized silica; average particle size: 1 µm) dispersed therein was mixed with the polyethylene composition to a total polyethylene resin concentration of 34 mass %, thereby preparing a polyethylene solution.

The polyethylene solution was extruded from a die into a sheet shape at a temperature of 200° C., and then, using a calendar roll cooled to 150° C., formed into a gel-like sheet (base tape) having a thickness of 100 µm. Subsequently, liquid paraffin was extracted from the base tape with methylene chloride, and pulverized silica was extracted with an aqueous sodium hydroxide solution. Subsequently, the base tape was drawn in the length direction at a temperature of 120° C. to 4.9 times the original length and successively drawn in the width direction at a temperature of 128° C. to 1.8 times the original length, immediately followed by a heat treatment (heat setting) at 128° C., thereby giving a polyolefin microporous membrane.

The obtained polyolefin microporous membrane had a low bubble point, excessively high water permeation efficiency, and insufficient collection efficiency for gold colloid particles having a particle size of 3 nm.

Comparative Example 3

A polyolefin microporous membrane was obtained in the same manner as in Example 1, except that using a polyethylene composition obtained by mixing 32 parts by mass of an ultrahigh-molecular-weight polyethylene having a mass average molecular weight of 4,600,000 (PE1) and 8 parts by mass of a high-density polyethylene having a mass average molecular weight of 560,000 (PE2), a pre-prepared mixed solvent containing 60 parts by mass of liquid paraffin was mixed with the polyethylene composition to a total polyethylene resin concentration of 40 mass %, thereby preparing a polyethylene solution, and the heat treatment (heat setting) temperature after drawing was 105° C.

The obtained polyolefin microporous membrane had an excessively high bubble point and excessively low, insufficient water permeation efficiency, and thus was not suitable as a substrate for a liquid filter.

Comparative Example 4

A polyethylene composition obtained by mixing 3 parts by mass of an ultrahigh-molecular-weight polyethylene having amass average molecular weight of 4,600,000 (PE1) and 27 parts by mass of a high-density polyethylene having a mass average molecular weight of 560,000 (PE2) was used. A pre-prepared mixed solvent of 45 parts by mass of liquid paraffin and 25 parts by mass of decalin (decahydronaphthalene) was mixed with the polyethylene composition to a total polyethylene resin concentration of 30 mass %, thereby preparing a polyethylene solution.

The polyethylene solution was extruded from a die into a sheet shape at a temperature of 148° C., and then the extruded article was cooled in a water bath at 20° C. to give a gel-like sheet (base tape). The base tape was dried at 60° C. for 8 minutes and further at 95° C. for 15 minutes to remove decalin from the inside of the base tape. Subsequently, the base tape was drawn in the length direction at a temperature of 90° C. to 5.5 times the original length and successively drawn in the width direction at a temperature of 105° C. to 11 times the original length, immediately followed by a heat treatment (heat setting) at 125° C.

Next, the resulting drawn film was immersed in a methylene chloride bath for 10 seconds to extract liquid paraffin. Subsequently, methylene chloride was removed by drying at 50° C., and the base tape was annealed while being conveyed on a roller heated to 120° C. to give a polyolefin microporous membrane.

The obtained polyolefin microporous membrane had a low bubble point, high tensile elongation, and insufficient collection efficiency such that the rate of collection of gold colloid particles having a particle size of 3 nm was less than 80%.

Comparative Example 5

A polyolefin microporous membrane was obtained in the same manner as in Comparative Example 4, except that using a polyethylene composition obtained by mixing 6 parts by mass of an ultrahigh-molecular-weight polyethylene having a mass average molecular weight of 4,600,000 (PE1) and 24 parts by mass of a high-density polyethylene having a mass average molecular weight of 560,000 (PE2), a pre-prepared mixed solvent of 67.5 parts by mass of liquid paraffin and 2.5 parts by mass of decalin (decahydronaphthalene) was mixed with the polyethylene composition to a total polyethylene resin concentration of 30 mass %, thereby preparing a polyethylene solution, and a gel-like sheet obtained by extrusion was drawn in the length direction to 6 times the original length and in the transverse direction to 9 times the original length, followed by a heat treatment (heat setting) at 130° C.

The obtained polyolefin microporous membrane had a low bubble point and insufficient collection efficiency such that the rate of collection of gold colloid particles having a particle size of 3 nm was less than 80%.

Comparative Example 6

A polyethylene composition obtained by mixing 4 parts by mass of an ultrahigh-molecular-weight polyethylene having a mass average molecular weight of 4,600,000 (PE1) and 6 parts by mass of a high-density polyethylene having a mass average molecular weight of 560,000 (PE2) was used. A pre-prepared mixed solvent of 55 parts by mass of liquid paraffin and 35 parts by mass of decalin (decahydronaphthalene) was mixed with the polyethylene composition to a total polyethylene resin concentration of 10 mass %, thereby preparing a polyethylene solution.

The polyethylene solution was extruded from a die into a sheet shape at a temperature of 160° C., and then the extruded article was cooled in a water bath at 25° C. At the same time, a stream of water was established on the surface layer of the water bath, and a gel-like sheet (base tape) was produced while preventing the mixed solvent released from a gelled sheet in the water bath and floating on the water surface from re-adhering to the sheet. The base tape was dried at 55° C. for 10 minutes and further at 95° C. for 10 minutes to remove decalin from the inside of the base tape. Subsequently, the base tape was conveyed on a roller heated to 85° C. while applying a pressing pressure of 20 kgf/m thereto, thereby removing some of liquid paraffin from the inside of the base tape. Subsequently, the base tape was drawn in the length direction at a temperature of 100° C. to 6 times the original length and successively drawn in the width direction at a temperature of 100° C. to 14 times the original length, immediately followed by a heat treatment (heat setting) at 135° C.

Next, the resulting drawn film was immersed in a two-tank methylene chloride bath successively for 30 seconds per tank, thereby extracting liquid paraffin. Incidentally, defining the tank where immersion is started as a first tank, and the tank where immersion is finished as a second tank, the purity of the washing solvent is (lower) first tank<second tank (higher). Subsequently, methylene chloride was removed by drying at 45° C., and the base tape was annealed while being conveyed on a roller heated to 110° C. to give a polyolefin microporous membrane.

The obtained polyolefin microporous membrane had excessively high compressibility, insufficient flow stability, and insufficient rupture resistance, and thus was not suitable as a substrate for a liquid filter.

Comparative Example 7

A polyethylene composition obtained by mixing 2 parts by mass of an ultrahigh-molecular-weight polyethylene having amass average molecular weight of 4,600,000 (PE1) and 28 parts by mass of a high-density polyethylene having a mass average molecular weight of 560,000 (PE2) was used. A pre-prepared mixed solvent of 45 parts by mass of liquid paraffin and 25 parts by mass of decalin (decahydronaphthalene) was mixed with the polyethylene composition to a total polyethylene resin concentration of 30 mass %, thereby preparing a polyethylene solution.

The polyethylene solution was extruded from a die into a sheet shape at a temperature of 148° C., and then the extruded article was cooled in a water bath at 20° C. to give a gel-like sheet (base tape). The base tape was dried at 60° C. for 8 minutes and further at 95° C. for 15 minutes to remove decalin from the inside of the base tape. Subsequently, the base tape was drawn in the length direction at a temperature of 90° C. to 5.5 times the original length and successively drawn in the width direction at a temperature of 105° C. to 11 times the original length, immediately followed by a heat treatment (heat setting) at 130° C.

Next, the resulting drawn film was immersed in a methylene chloride bath for 10 seconds to extract liquid paraffin. Subsequently, methylene chloride was removed by drying at 50° C., and the base tape was annealed while being conveyed on a roller heated to 120° C. to give a polyolefin microporous membrane.

The obtained polyolefin microporous membrane had excessively high compressibility, insufficient collection efficiency such that the rate of collection of gold colloid particles having a particle size of 3 nm was less than 80%, and insufficient flow stability, and thus was not suitable as a substrate for a liquid filter.

Comparative Example 8

A T-die sheet was prepared from a mixture of a high-molecular-weight polyethylene having a mass average molecular weight of 5,000,000 (intrinsic viscosity [1]=16.5 dl/g) and paraffin wax (melting point: 69° C.). Here, the raw materials were mixed in the following ratio: high-molecular-weight polyethylene:paraffin wax=3:7. Next, paraffin wax was extracted for 10 minutes in n-decane at 80° C., followed by drying in an air oven at 60° C. The extraction and drying were performed with the direction of the length of the sheet being fixed. Subsequently, biaxial drawing was performed to give a porous film.

The obtained polyolefin microporous membrane had excessively high water permeation efficiency, excessively high compressibility, and insufficient flow stability, and thus was not suitable as a substrate for a liquid filter.

Comparative Example 9

An inflation film having a thickness of 45 μm (draft ratio: 8.7, inflation ratio: 8) was prepared from a high-molecular-weight polyethylene having a mass average molecular weight of 5,000,000 (intrinsic viscosity [η]=16.5 dl/g). Next, with the four directions of the film being fixed, the film was treated in n-paraffin (melting point: 28.1° C.) at 128° C. for 2 minutes and then immersed in n-hexane for 2 hours to completely extract n-paraffin, and then n-hexane was dried in an air oven, followed by fixed-width uniaxial drawing at a drawing speed of 1.5 m/min in air, thereby giving a porous film.

The obtained polyolefin microporous membrane had a low bubble point, excessively high water permeation efficiency, insufficient collection efficiency for gold colloid particles having a particle size of 3 nm, and insufficient flow stability, and thus was not suitable as a substrate for a liquid filter.

Comparative Example 10

A dry blend of 20 parts by mass of a high-molecular-weight polyethylene having a mass average molecular weight of 4,400,000 (viscosity average molecular weight: 2,000,000) and 80 parts by mass of granular stearyl alcohol was fed to an extruder, and, with kneading at 240° C., continuously extruded from a T-die having a width of 550 mm and a die clearance of 0.4 mm to give a sheet having a thickness of 150 μm. The sheet was subjected to stearyl alcohol extraction in an isopropyl alcohol bath at 60° C. to give a porous membrane made of polyethylene having a thickness of 120 μm. The membrane was drawn in the length direction at 100° C. to 3.5 times the original length and then drawn in the direction perpendicular to the length direction at 125° C. to 9.1 times the original length, thereby giving a porous membrane having a thickness of 10 μm.

The obtained polyolefin microporous membrane had a low bubble point, excessively high water permeation efficiency, and insufficient collection efficiency such that the rate of collection of gold colloid particles having a particle size of 3 nm was less than 80%, and thus was not suitable as a substrate for a liquid filter.

TABLE 1

| | | Example 1 | Example 2 | Example 3 | Example 4 | Example 5 |
|---|---|---|---|---|---|---|
| Composition of Solution | Decalin (part by mass) | 3 | 3 | 3 | 10 | 15 |
| | Paraffin (part by mass) | 69 | 69 | 69 | 55 | 53 |
| | PE concentration (mass %) | 28 | 28 | 28 | 35 | 32 |
| | PE 1 (part by mass) | 5 | 5 | 5 | 4 | 8 |
| | PE 1 Mw | 4,600,000 | 4,600,000 | 4,600,000 | 4,600,000 | 4,600,000 |
| | PE 2 (part by mass) | 23 | 23 | 23 | 31 | 24 |
| | PE 2 Mw | 560,000 | 560,000 | 560,000 | 560,000 | 560,000 |
| | PE 3 (part by mass) | — | — | — | — | — |
| | PE 3 Mw | — | — | — | — | — |
| | Inorganic powder (part by mass) | — | — | — | — | — |
| Extrusion | Die temperature (° C.) | 160 | 160 | 160 | 160 | 160 |
| | Cooling temperature (° C.) | 25 | 25 | 25 | 25 | 25 |
| Expression | First drying temperature (° C.) | 55 | 55 | 55 | 55 | 55 |
| | First drying time (min) | 10 | 10 | 10 | 10 | 10 |
| | Second drying temperature (° C.) | 95 | 95 | 95 | 95 | 95 |
| | Second drying time (min) | 10 | 10 | 10 | 10 | 10 |
| | Expression temperature (° C.) | 85 | 40 | 95 | 85 | 85 |
| | Expression pressure (kgf/m) | 20 | 40 | 5 | 20 | 20 |
| Drawing | Longitudinal drawing temperature (° C.) | 100 | 90 | 95 | 100 | 100 |
| | Longitudinal draw ratio | 5.8 | 5.8 | 6.5 | 5 | 4 |
| | Transverse drawing temperature (° C.) | 100 | 90 | 95 | 100 | 100 |
| | Transverse draw ratio | 14 | 14 | 13 | 9 | 15 |
| | Heat set temperature (° C.) | 118 | 124 | 114 | 114 | 118 |
| Extraction | Extraction time (sec) | 60 | 60 | 60 | 60 | 60 |
| | Drying temperature (° C.) | 45 | 45 | 45 | 45 | 45 |
| | Annealing temperature (° C.) | 110 | 110 | 110 | 110 | 110 |

| | | Example 6 | Example 7 | Example 8 | Example 9 | Example 10 |
|---|---|---|---|---|---|---|
| Composition of Solution | Decalin (part by mass) | 3 | 3 | 3 | 10 | 15 |
| | Paraffin (part by mass) | 69 | 69 | 69 | 55 | 55 |
| | PE concentration (mass %) | 28 | 28 | 28 | 35 | 30 |
| | PE 1 (part by mass) | 6 | 6 | 6 | 5 | 8 |
| | PE 1 Mw | 4,600,000 | 4,600,000 | 4,600,000 | 4,600,000 | 4,600,000 |
| | PE 2 (part by mass) | 22 | 22 | 22 | 30 | 22 |
| | PE 2 Mw | 560,000 | 560,000 | 560,000 | 560,000 | 560,000 |
| | PE 3 (part by mass) | — | — | — | — | — |
| | PE 3 Mw | — | — | — | — | — |
| | Inorganic powder (part by mass) | — | — | — | — | — |
| Extrusion | Die temperature (° C.) | 160 | 160 | 160 | 160 | 160 |
| | Cooling temperature (° C.) | 25 | 25 | 25 | 25 | 25 |
| Expression | First drying temperature (° C.) | 55 | 55 | 55 | 55 | 55 |
| | First drying time (min) | 10 | 10 | 10 | 10 | 10 |
| | Second drying temperature (° C.) | 95 | 95 | 95 | 95 | 95 |
| | Second drying time (min) | 10 | 10 | 10 | 10 | 10 |
| | Expression temperature (° C.) | 85 | 40 | 95 | 85 | 85 |
| | Expression pressure (kgf/m) | 20 | 40 | 5 | 20 | 20 |
| Drawing | Longitudinal drawing temperature (° C.) | 100 | 90 | 95 | 100 | 100 |
| | Longitudinal draw ratio | 5.8 | 5.8 | 6.5 | 5 | 4 |
| | Transverse drawing temperature (° C.) | 100 | 90 | 95 | 100 | 100 |
| | Transverse draw ratio | 14 | 14 | 13 | 9 | 15 |
| | Heat set temperature (° C.) | 118 | 124 | 114 | 114 | 118 |
| Extraction | Extraction time (sec) | 60 | 60 | 60 | 60 | 60 |
| | Drying temperature (° C.) | 45 | 45 | 45 | 45 | 45 |
| | Annealing temperature (° C.) | 110 | 110 | 110 | 110 | 110 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition of Solution | Decalin (part by mass) | 5 | — | — | 25 | 2.5 | 35 | 25 |
| | Paraffin (part by mass) | 70 | 45 | 60 | 45 | 67.5 | 55 | 45 |
| | PE concentration (mass %) | 25 | 34 | 40 | 30 | 30 | 10 | 30 |
| | PE 1 (part by mass) | 5 | 10 | 32 | 3 | 6 | 4 | 2 |
| | PE 1 Mw | 4,600,000 | 4,600,000 | 4,600,000 | 4,600,000 | 4,600,000 | 4,600,000 | 4,600,000 |
| | PE 2 (part by mass) | 20 | 24 | 8 | 27 | 24 | 6 | 28 |
| | PE 2 Mw | 560,000 | 560,000 | 560,000 | 560,000 | 560,000 | 560,000 | 560,000 |
| | PE 3 (part by mass) | — | — | — | — | — | — | — |
| | PE 3 Mw | — | — | — | — | — | — | — |
| | Inorganic powder (part by mass) | — | 21 | — | — | — | — | — |
| Extrusion | Die temperature (° C.) | 148 | 200 | 160 | 148 | 148 | 160 | 148 |
| | Cooling temperature (° C.) | 20 | 150 | 25 | 20 | 20 | 25 | 20 |

TABLE 2-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Expression | First drying temperature (° C.) | 60 | — | 55 | 60 | 60 | 55 | 60 |
|  | First drying time (min) | 8 | — | 10 | 8 | 8 | 10 | 8 |
|  | Second drying temperature (° C.) | 95 | — | 95 | 95 | 95 | 95 | 95 |
|  | Second drying time (min) | 15 | — | 10 | 15 | 15 | 10 | 15 |
|  | Expression temperature (° C.) | — | — | 85 | — | — | 85 | — |
|  | Expression pressure (kgf/m) | — | — | 20 | — | — | 20 | — |
| Drawing | Longitudinal drawing temperature (° C.) | 90 | 120 | 100 | 90 | 90 | 100 | 90 |
|  | Longitudinal draw ratio | 6 | 4.9 | 5.8 | 5.5 | 6 | 6 | 5.5 |
|  | Transverse drawing temperature (° C.) | 105 | 128 | 100 | 105 | 105 | 100 | 105 |
|  | Transverse draw ratio | 9 | 1.8 | 14 | 11 | 9 | 14 | 11 |
|  | Heat set temperature (° C.) | 126 | 128 | 105 | 125 | 130 | 135 | 130 |
| Extraction | Extraction time (sec) | 10 | — | 60 | 10 | 10 | 60 | 10 |
|  | Drying temperature (° C.) | 50 | — | 45 | 50 | 50 | 45 | 50 |
|  | Annealing temperature (° C.) | 120 | — | 110 | 120 | 120 | 110 | 120 |

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Thickness (μm) | 11 | 12 | 8 | 13 | 10 | 11 | 12 | 8 | 13 | 10 |
| Porosity (%) | 49 | 53 | 47 | 50 | 46 | 49 | 53 | 47 | 50 | 46 |
| Bubble Point (MPa) | 0.60 | 0.50 | 0.70 | 0.60 | 0.80 | 0.60 | 0.50 | 0.70 | 0.60 | 0.80 |
| Water Permeation Efficiency (ml/min · cm$^2$) | 0.30 | 0.40 | 0.20 | 0.25 | 0.15 | 0.25 | 0.35 | 0.15 | 0.20 | 0.10 |
| Cushion Factor (%) | 45 | 60 | 35 | 40 | 32 | 45 | 60 | 35 | 40 | 32 |
| Tensile Elongation MD (%) | 90 | 60 | 130 | 170 | 190 | 100 | 60 | 150 | 190 | 170 |
| Elongation Ratio MD/TD | 1.3 | 2.6 | 1.0 | 1.1 | 3.2 | 1.2 | 2.5 | 0.9 | 1.0 | 3.5 |
| 120° C. TD Heat Shrinkage (%) | 20 | 16 | 25 | 20 | 25 | 20 | 16 | 25 | 20 | 25 |
| 130° C. TD Heat Shrinkage (%) | 24 | 20 | 32 | 28 | 30 | 25 | 22 | 35 | 30 | 33 |
| Pore-Blocking Temperature (° C.) | 144 | 141 | 145 | 143 | 147 | 144 | 141 | 145 | 143 | 147 |
| Compressibility (%) | 7 | 12 | 5 | 10 | 3 | 7 | 12 | 5 | 10 | 3 |
| 3-nm Collection Efficiency | AA | A | AA | AA | AA | AA | A | AA | AA | AA |
| Flow Stability | AA | AA | AA | AA | A | AA | AA | A | AA | A |
| Rupture Resistance | A | A | A | A | A | A | A | A | A | A |
| Dissolution Resistance | A | A | A | A | A | A | A | A | A | A |

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Thickness (μm) | 12 | 15 | 13 | 13 | 12 | 15 | 13 | 30 | 96 | 10 |
| Porosity (%) | 51 | 48 | 34 | 50 | 51 | 63 | 52 | 65 | 77 | 70 |
| Bubble Point (MPa) | 0.40 | 0.30 | 0.90 | 0.30 | 0.40 | 0.37 | 0.30 | 0.18 | 0.07 | 0.41 |
| Water Permeation Efficiency (ml/min · cm$^2$) | 0.60 | 0.70 | 0.05 | 0.50 | 0.55 | 1.90 | 0.50 | 17.1 | 0.81 | 2.66 |
| Cushion Factor (%) | 60 | 50 | 28 | 65 | 60 | 60 | 55 | 67 | 70 | 75 |
| Tensile Elongation MD (%) | 180 | 42 | 180 | 210 | 170 | 140 | 190 | 200 | 250 | 150 |
| Elongation Ratio MD/TD | 0.7 | 0.2 | 1.0 | 3.0 | 1.1 | 1.4 | 1.2 | 0.9 | 1.0 | 1.2 |
| 120° C. TD Heat Shrinkage (%) | 9 | 3 | 30 | 12 | 9 | 16 | 14 | 25 | 30 | 20 |
| 130° C. TD Heat Shrinkage (%) | 15 | 6 | 40 | 20 | 13 | 33 | 30 | 35 | 40 | 30 |
| Pore-Blocking Temperature (° C.) | 138 | 136 | 148 | 140 | 138 | 140 | 140 | 145 | 148 | 140 |
| Compressibility (%) | 11 | 5 | 2 | 15 | 11 | 16 | 18 | 25 | 35 | 30 |
| 3-nm Collection Efficiency | B | B | AA | B | B | B | B | B | B | B |
| Flow Stability | A | B | B | B | A | A | B | B | B | B |
| Rupture Resistance | A | A | A | A | A | B | A | B | B | B |
| Dissolution Resistance | B | B | A | B | B | A | B | B | B | B |

The invention claimed is:

1. A substrate for a liquid filter, comprising a polyolefin microporous membrane,
   the polyolefin microporous membrane having a water permeation efficiency 0.10 to 0.50 ml/min·cm² at a pressure differential of 90 kPa,
   the polyolefin microporous membrane having a bubble point of 0.50 MPa or more and 0.80 MPa or less,
   the polyolefin microporous membrane having a thickness of 7 to 15 µm, and
   the polyolefin being a composition of 5 to 27 mass % of an ultrahigh-molecular-weight polyethylene having a mass average molecular weight of 900,000 or more and 73 to 95 mass % of a high-density polyethylene having a mass average molecular weight of 200,000 to 800,000.

2. The substrate for a liquid filter according to claim 1, wherein the polyolefin microporous membrane has a heat shrinkage of 15% or more in the width direction after a heat treatment at 120° C. for 1 hour.

3. The substrate for a liquid filter according to claim 1, wherein the polyolefin microporous membrane has a tensile elongation of more than 55% and 200% or less in the length direction.

4. The substrate for a liquid filter according to claim 1, wherein the polyolefin microporous membrane has a cushion factor of more than 30%.

5. The substrate for a liquid filter according to claim 1, wherein the polyolefin microporous membrane has a pore-blocking temperature of more than 140° C.

6. The substrate for a liquid filter according to claim 1, wherein the polyolefin microporous membrane has a compressibility of less than 15%.

7. The substrate for a liquid filter according to claim 1, wherein the polyolefin microporous membrane has a porosity of 46 to 54%.

8. The substrate for a liquid filter according to claim 1, wherein the ratio of the tensile elongation in the length direction (MD tensile elongation) to the tensile elongation in the width direction (TD tensile elongation) of the polyolefin microporous membrane (MD tensile elongation/TD tensile elongation) is 0.8 to 4.0.

9. The substrate for a liquid filter according to claim 1, wherein the substrate is obtained by preparing a solution containing a polyethylene composition and a solvent including a volatile solvent having a boiling point of less than 210° C. at least at atmospheric pressure;
   melt-kneading the solution, extruding the obtained melt-kneaded article from a die, and cooling and solidifying the same to give a gel-like molded article;
   prior to drawing the gel-like molded article in at least one direction, expressing some of the solvent from the gel-like molded article;
   drawing the gel-like molded article in at least one direction;
   heat set treating the drawn gel-like molded article at heat set temperature of from 110° C. to 124° C. to form a drawn intermediate molded article; and
   extracting and washing the solvent from inside of the drawn intermediate molded article.

* * * * *